US011669285B1

(12) United States Patent
Hu

(10) Patent No.: US 11,669,285 B1
(45) Date of Patent: Jun. 6, 2023

(54) IMAGE FORMING SYSTEM, SERVER, AND LOCATING METHOD CAPABLE TO FIND AUTHENTICATED IMAGE FORMING APPARATUS FROM TERMINAL

(71) Applicant: KYOCERA Document Solutions Inc., Osaka (JP)

(72) Inventor: Jiangang Hu, Martinez, CA (US)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 17/540,866

(22) Filed: Dec. 2, 2021

(51) Int. Cl.
*G06F 3/12* (2006.01)

(52) U.S. Cl.
CPC .......... *G06F 3/1226* (2013.01); *G06F 3/1222* (2013.01); *G06F 3/1238* (2013.01); *G06F 3/1288* (2013.01)

(58) Field of Classification Search
None
See application file for complete search history.

(56) References Cited

U.S. PATENT DOCUMENTS

2007/0283273 A1* 12/2007 Woods .................... G06F 16/95 715/738
2017/0262243 A1 9/2017 Najari et al.

FOREIGN PATENT DOCUMENTS

JP H06103008 A * 4/1994
JP 2006195765 A * 7/2006
JP 2009042807 A * 2/2009
JP 2017-162461 A 9/2017

OTHER PUBLICATIONS

English translation of JP-H06103008-A. (Year: 1994).*
English translation of JP-2006185765-A. (Year: 2006).*
English translation of JP-2009042807-A. (Year: 2009).*

* cited by examiner

*Primary Examiner* — Thomas D Lee
(74) *Attorney, Agent, or Firm* — Hawaii Patent Services; Nathaniel K. Fedde; Kenton N. Fedde

(57) ABSTRACT

Provided is an image forming system that can find an authenticated image forming apparatus from a mobile terminal. The installation transmitting unit transmits the installation location information to the server. The position acquisition unit acquires position information. The location presentation unit receives the installation location information indicating the installation location of the image forming apparatus close to the position information from the server and presents it to the user. The location acquisition unit acquires installation location information from each of the plurality of image forming apparatuses. When authenticated by the authentication unit, the location search unit searches for the installation location information stored in the storage unit based on the position information and transmits it to the terminal. The confidential document acquisition unit acquires the confidential document in response to an instruction from the terminal authenticated by the server.

9 Claims, 8 Drawing Sheets

TERMINAL
3
IMAGE FORMING
APPARATUS
2-1
5a
PUBLIC NETWORK
6
FIREWALL
5b
PRIVATE NETWORK
1
SERVER
2-2
IMAGE FORMING
APPARATUS
2-3
IMAGE FORMING
APPARATUS
X

CONTROL UNIT
30
STORAGE UNIT
39
NETWORK TRANSMITTING AND RECEIVING UNIT
35
PUBLIC NETWORK 5a
3
POSITION ACQUISITION UNIT
38
INPUT UNIT
36
DISPLAY UNIT
37

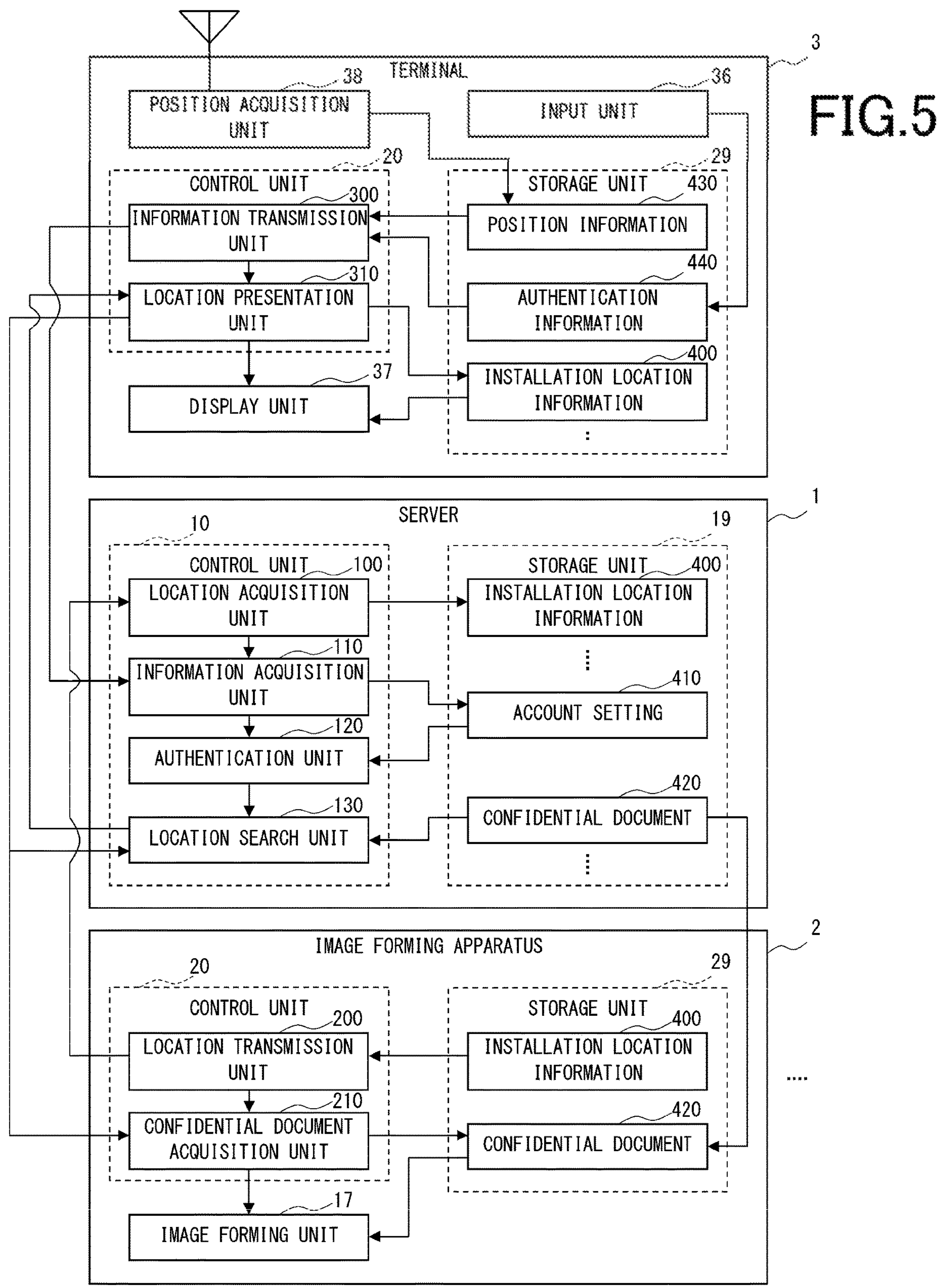

FIG.5
TERMINAL
3
38
POSITION ACQUISITION UNIT
36
INPUT UNIT
20
CONTROL UNIT
300
INFORMATION TRANSMISSION UNIT
310
LOCATION PRESENTATION UNIT
37
DISPLAY UNIT
29
STORAGE UNIT
430
POSITION INFORMATION
440
AUTHENTICATION INFORMATION
400
INSTALLATION LOCATION INFORMATION
SERVER
1
10
CONTROL UNIT
100
LOCATION ACQUISITION UNIT
110
INFORMATION ACQUISITION UNIT
120
AUTHENTICATION UNIT
130
LOCATION SEARCH UNIT
19
STORAGE UNIT
400
INSTALLATION LOCATION INFORMATION
410
ACCOUNT SETTING
420
CONFIDENTIAL DOCUMENT
IMAGE FORMING APPARATUS
2
20
CONTROL UNIT
200
LOCATION TRANSMISSION UNIT
210
CONFIDENTIAL DOCUMENT ACQUISITION UNIT
17
IMAGE FORMING UNIT
29
STORAGE UNIT
400
INSTALLATION LOCATION INFORMATION
420
CONFIDENTIAL DOCUMENT
X

IMAGE FORMING SYSTEM, SERVER, AND LOCATING METHOD CAPABLE TO FIND AUTHENTICATED IMAGE FORMING APPARATUS FROM TERMINAL

BACKGROUND

The disclosure relates specifically to an image forming system, a server, and a locating method for printing confidential document on the go.

There is an image forming apparatus such as multifunction peripheral (MFP) that can print documents and images.

Further, printing a document stored in the server by an external image forming apparatus is also considered.

As a typical technology, a method of identifying a printing apparatus and performing printing is disclosed. In this method, in a transmission step, wireless beacons are transmitted from each of the plurality of printing apparatus. In a receiving step, which of the plurality of printing apparatuses is in the most recent position of the portable apparatus is determined based on the radio signal strength of the wireless beacon. Then, the printing apparatus is selected and connected via the wireless network. Next, the instruction is transmitted to the printing apparatus. Then, the instruction to print the information in the printing apparatus is received from the portable apparatus via the network. In the printing process, information is printed based on an instruction in the printing apparatus selected by the portable apparatus.

SUMMARY

An image forming system of the present disclosure is an image forming system having a terminal, a server, and a plurality of image forming apparatuses, wherein: the terminal includes: a position acquisition unit that acquires position information, an input unit configured to input authentication information, an information transmission unit that transmits the position information acquired by the position acquisition unit and the authentication information inputted by the input unit to the server, and a location presentation unit that receives and presents installation location information indicating an installation location of an image forming apparatus close to the position information from the server; the server includes: a location acquisition unit that acquires the installation location information from each of the plurality of image forming apparatuses, a storage unit that stores the installation location information and a confidential document acquired by the location acquisition unit, an information acquisition unit that acquires the position information and the authentication information from the terminal, an authentication unit that authenticates with the authentication information acquired by the information acquisition unit, and a location search unit that searches for the installation location information stored in the storage unit and transmits the installation location to the terminal based on the position information when authenticated by the authentication unit; and each of the plurality of image forming apparatuses includes: an installation transmitting unit that transmits the installation location information to the server, a confidential document acquisition unit that acquires the confidential document in response to an instruction from the terminal authenticated by the server, and an image forming unit that forms an image of the confidential document.

A server of the present disclosure is a server of an image forming system having a terminal, a server, and a plurality of image forming apparatus, including: a location acquisition unit that acquires installation location information from each of the plurality of image forming apparatuses; a storage unit that stores the installation location information and a confidential document acquired by the location acquisition unit; an information acquisition unit that acquires position information and authentication information from the terminal; an authentication unit that authenticates with the authentication information acquired by the information acquisition unit; and a location search unit that searches for the installation location information stored in the storage unit and transmits the installation location to the terminal based on the position information when authenticated by the authentication unit.

A locating method of the present disclosure is a locating method performed by an image forming system having a terminal, a server, and a plurality of image forming apparatuses, including the steps of: by each of the plurality of image forming apparatuses, transmitting installation location information to the server; by the server, acquiring the installation location information from each of the plurality of image forming apparatuses; by the server, storing the installation location information and a confidential document; by the terminal, acquiring position information; by the terminal, inputting authentication information; by the terminal, transmitting acquired position information and inputted authentication information to the server; by the server, acquiring the position information and the authentication information from the terminal; by the server, authenticating with acquired authentication information; by the server, searching for stored installation location information based on the position information and transmitting the installation location to the terminal when authenticated; by the terminal, receiving and presenting the installation location information indicating the installation location of the image forming apparatus close to the position information from the server; and by each of the plurality of image forming apparatuses, acquiring the confidential document in response to an instruction from the terminal authenticated by the server.

BRIEF DESCRIPTION OF THE DRAWINGS

FIG. 5 is a block diagram showing a functional configuration of the image forming system according to the embodiment of the present disclosure;

DETAILED DESCRIPTION

Embodiment

[System Configuration of Image Forming System X]

Figure 1:
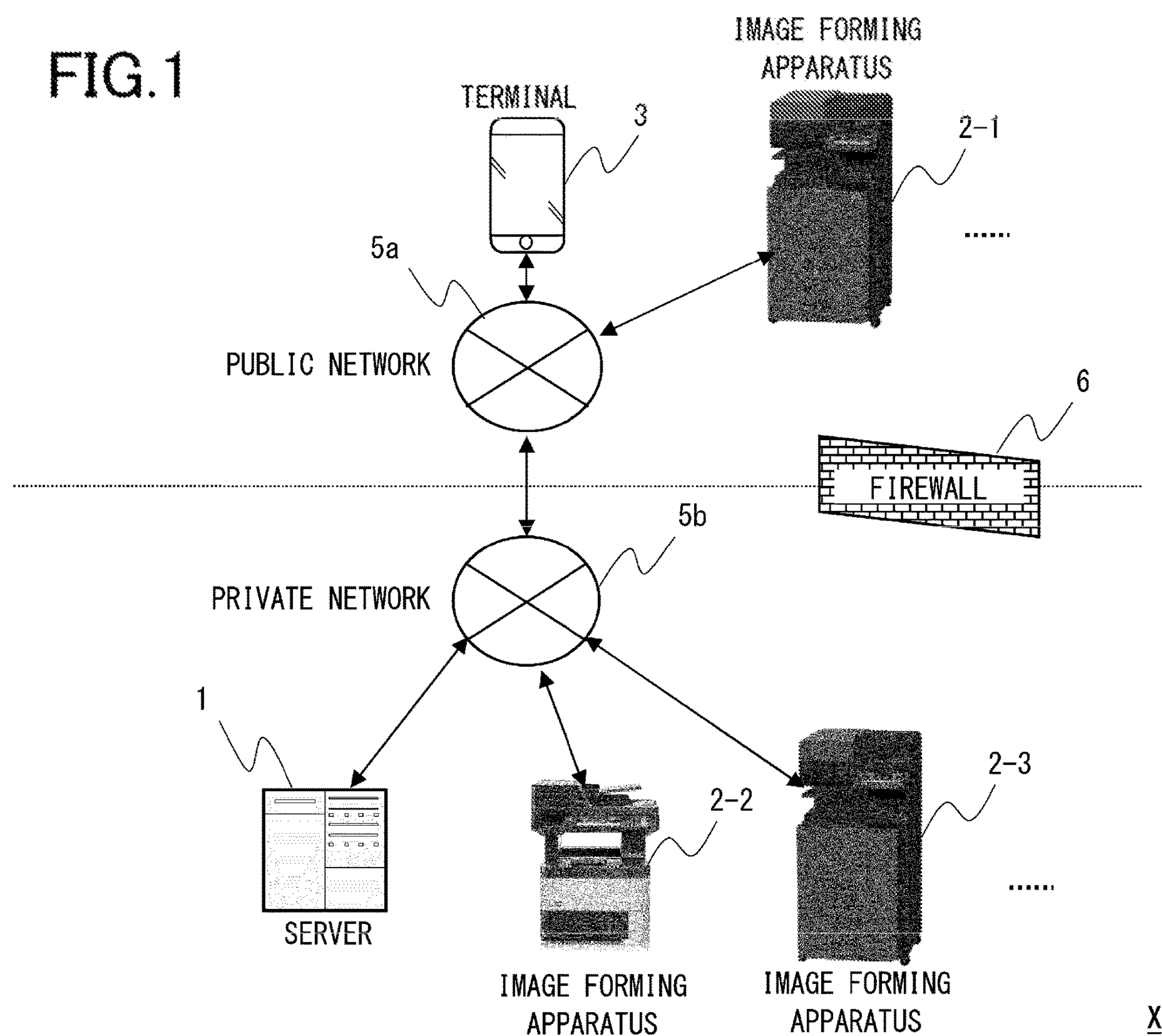
FIG. 1 is a system configuration diagram of an image forming system according to an embodiment of the present disclosure.

Firstly, with reference to FIG. 1, the system configuration of the image forming system X is described.

The image forming system X according to the present embodiment is a system capable of printing the confidential document 420 from the outside.

The image forming system X according to the embodiment of the present disclosure is configured with a server 1, a plurality of authenticated image forming apparatuses 2-1 to 2-*n*, a user's terminal 3, a public network 5*a* and a private network 5*b* for connecting these, a firewall 6, and the like.

The server 1 is a security document server that stores a confidential document 420 (FIG. 5), which is secured and protected, and registers authenticated image forming apparatuses 2-1 to 2-*n* (a plurality of image forming apparatuses). The server 1 is configured with a general-purpose apparatus, a PC (Personal Computer) server, and the like. Server 1 may be protected with security.

The server 1 acquires the position information 430 from the terminal 3 and searches for the authenticated image forming apparatuses 2-1 to 2-*n* in the vicinity. On this basis, the print request is efficiently processed.

In the present embodiment, the server 1 may perform, for example, billing and service handling, image processing, OCR (Optical Character Recognition) processing, classification processing, or the like. In addition, the server 1 may perform a transmission process for an e-mail, a shared folder (document box, storage folder), a business or office DMS (Document Management System), or the like.

The image forming apparatuses 2-1 to 2-*n* are authenticated apparatuses connected to the network so that the confidential document 420 (FIG. 5) can be printed out from the outside. The image forming apparatus 2-1 to 2-*n* may be, for example, a document printing apparatus such as an MFP, a network printer, or the like.

Specifically, in the present embodiment, the image forming apparatus 2-1 to 2-*n* can be installed in a military base, a government office, a university campus, a corporate branch, a designated print shop, or the like, and is expandable to domestic and foreign countries. At this time, the image forming apparatus 2-1 to 2-*n* may execute application software (hereinafter simply referred to as "application") for connecting to the server 1. As a result, even if the image forming apparatuses 2-1 to 2-*n* are arranged in the public network 5*b*, they can be connected to the server 1 and authenticated beyond the firewall 6 as described later. On this basis, the authenticated image forming apparatuses 2-1 to 2-*n* can acquire the confidential document 420 from the server 1 and print it out.

The terminal 3 is a mobile terminal carried by a user such as a traveler registered on the server 1, or the like, and used to print the confidential document 420 at the travel destination. The terminal 3 may be, for example, a mobile phone, a smartphone, a tablet terminal, a notebook PC (Personal Computer), a "2in1" terminal, a PDA (Personal Data Assistant), or the other mobile device.

In this embodiment, in order to print the confidential document 420 (FIG. 5), the terminal 3 can search for a nearby image forming apparatus 2-1 to 2-*n*. At the time of this search, the terminal 3 activates a dedicated application for confidential printing. Then, the terminal 3 transmits the position information 430 to the server 1. As a result, the terminal 3 receives the information of the nearby authenticated image forming apparatus 2-1 to 2-*n* from the server 1 and presents it to the user.

The public network 5*a* is a WAN (Wide Area Network) such as the Internet, a mobile phone network, or the like.

The private network 5*b* is an intranet configured with a LAN (Local Area Network), a dedicated line, or the like.

These public networks 5*a* and private networks 5*b* are connected via a router, a gateway, or the like, including a firewall 6 for which a specific rule is set to transmit packets of a specific port, or the like. That is, in the present embodiment, the private network 5*b* may be enhanced in security and protected.

Further, both the public network 5*a* and the private network 5*b* may be configured with a VPN (Virtual Private Network).

In a configuration example of the image forming system X according to the present embodiment as shown in FIG. 1, the image forming apparatus 2-1 and the terminal 3 are connected to the public network 5*a*.

On the other hand, the image forming apparatus 2-2, the image forming apparatus 2-3, and the server 1 are connected to the private network 5*b*.

In addition, in the following, when any one of the image forming apparatus 2-1, . . . , 2-*n* is shown, it is simply referred to as "image forming apparatus 2".

(Control Configuration of Server 1)

Figure 2:
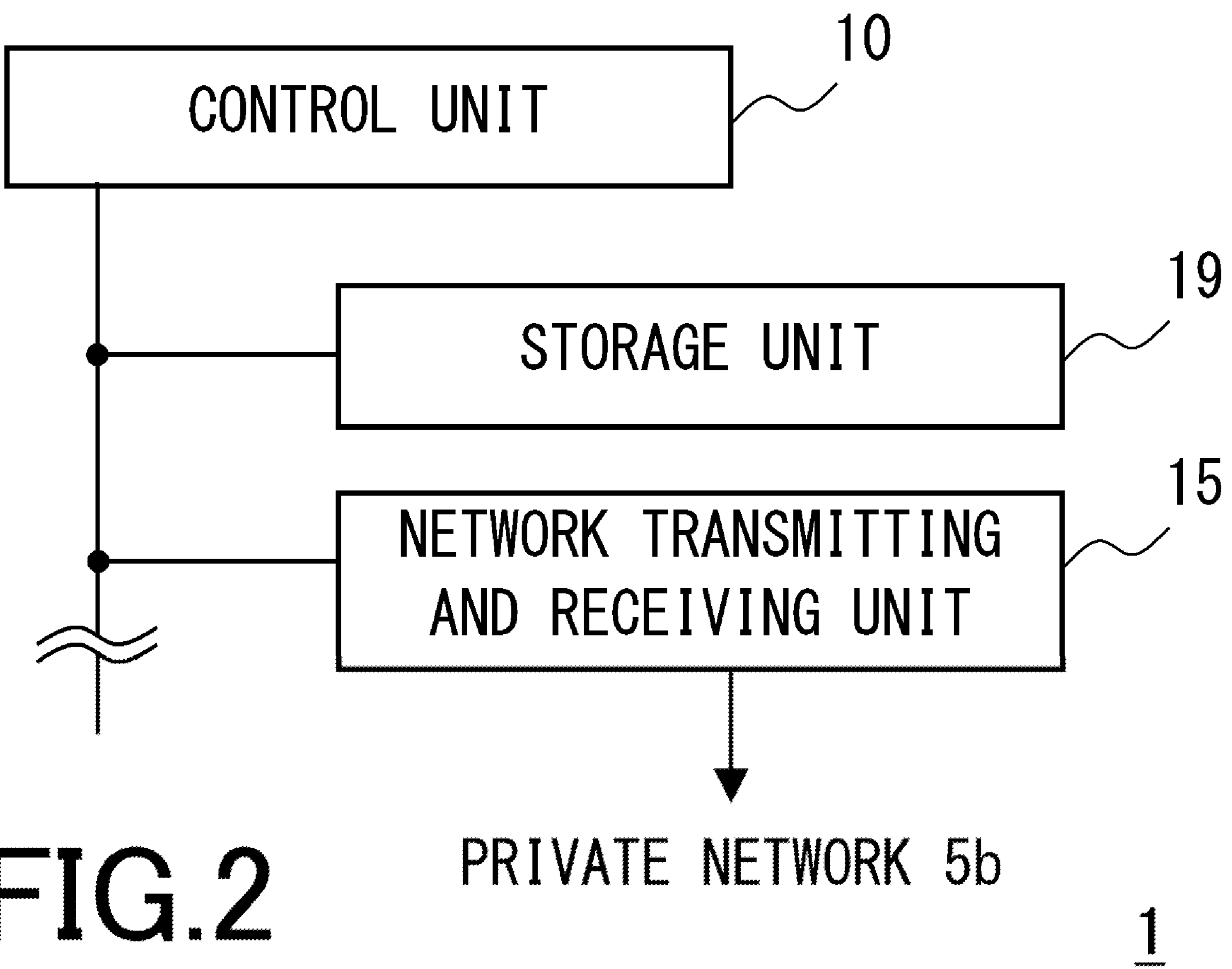
FIG. 2 is a block diagram showing the control configuration of the server as shown in FIG. 1.

Next, with reference to FIG. 2, the control configuration of the server 1 is described.

The server 1 includes a control unit 10, a network transmitting and receiving unit 15, and a storage unit 19. Each unit is connected to the control unit 10 and its operation is controlled by the control unit 10.

The control unit 10 is an information processing part such as a CPU (Central Processing Unit), an MPU (Micro Processing Unit), a DSP (Digital Signal Processor), a GPU (Graphics Processing Unit), an ASIC (Application-Specific Integrated Circuit: a processor for specific applications), or the like.

The control unit 10 reads out the control program stored in the auxiliary storage unit of the storage unit 19, expands the control program in the main storage unit, and executes it, so that the control unit 10 can be operated as each unit of the functional block as described later.

The network transmitting and receiving unit 15 is a network connection unit such as a LAN board, a wireless transmitter and receiver, and the like, for connecting to the public network 5*a* or the private network 5*b*.

The storage unit 19 is a storage part by using a non-transitory recording medium.

The storage unit 19 may include a RAM (Random Access Memory), or the like, as the main storage unit.

Further, the storage unit 19 may include a ROM (Read Only Memory), an HDD (Hard Disk Drive), or the like, as an auxiliary storage unit. The ROM may be a flash memory recording medium such as an eMMC (embedded Multi Media Card), an SSD (Solid State Drive), or the like. A control program for controlling the operation of the server 1 is stored in the auxiliary storage unit of the storage unit 19. Further, the storage unit 19 may include map data for converting the position information 430 (FIG. 5) into a physical address such as a postal address, or the like.

In addition to this, the storage unit 19 may also store the user's account setting 410. Further, the storage unit 19 may reserve an area of a document box (save folder, shared folder) for each user.

Further, the control unit 10 may have a built-in RAM, ROM, flash memory, or the like.

(Structure of Image Forming Apparatus 2)

Figure 3:
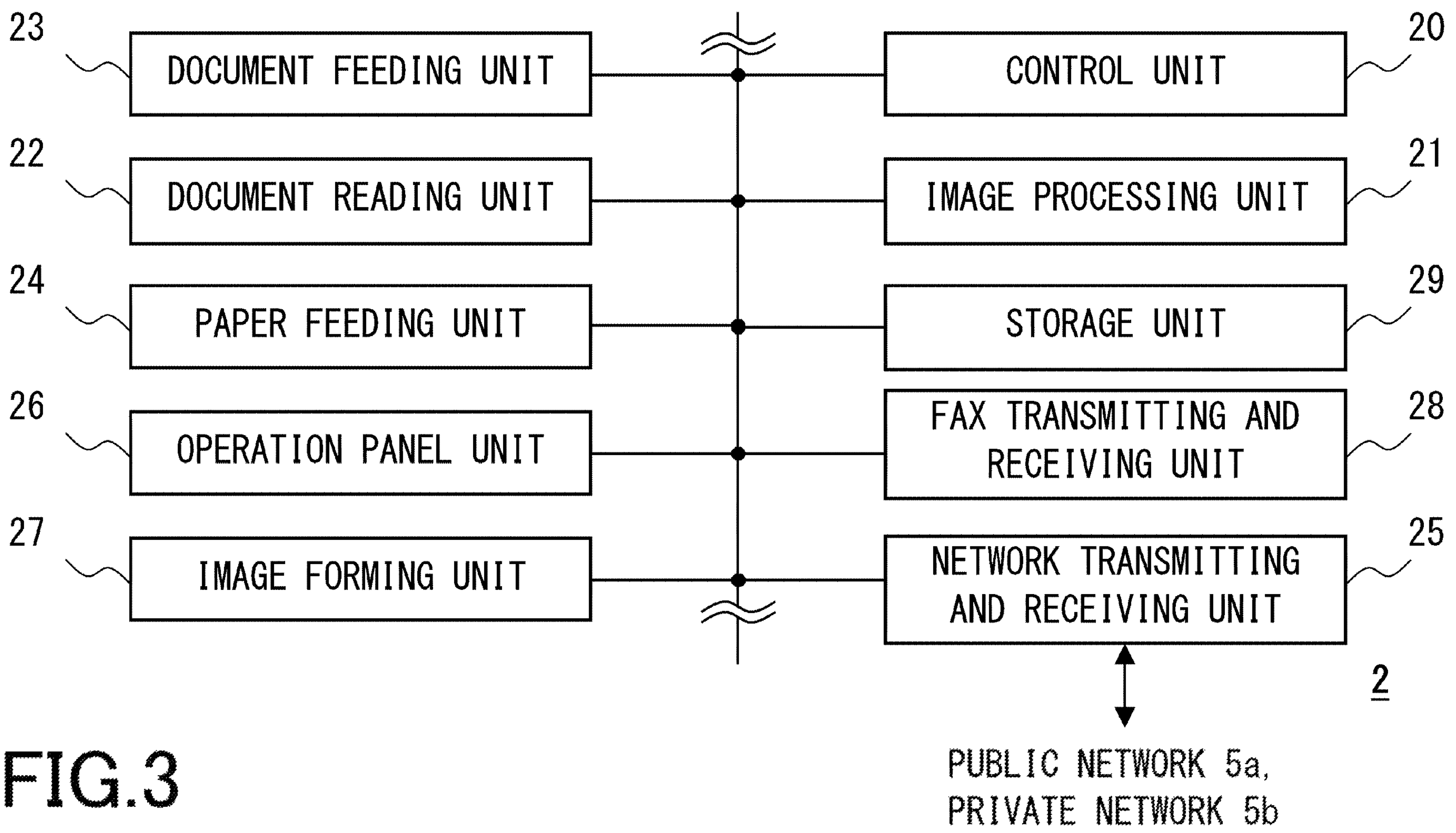
FIG. 3 is a block diagram showing a control configuration of the image forming apparatus as shown in FIG. 1.

Next, with reference to FIG. 3, the configuration of the image forming apparatus 2 is described.

The image forming apparatus 2 includes a control unit 20, an image processing unit 21, a document reading unit 22, a document feeding unit 23, a paper feeding unit 24, a network transmitting and receiving unit 25, an operation panel unit 26, an image forming unit 27, and a fax transmitting and receiving unit 28, and a storage unit 29. Each unit is connected to the control unit 20 and its operation is controlled by the control unit 20.

The control unit 20 is an information processing part such as a GPP (General Purpose Processor), a CPU, an MPU, a DSP, a GPU, an ASIC, or the like.

The control unit 20 reads out the control program stored in the auxiliary storage unit of the storage unit 29, expands the control program in the main storage unit, and executes it, so that the control unit 20 can be operated as each part of the functional block as described later. Further, the control unit 20 controls the entire apparatus according to instruction information inputted from the terminal 3 or the operation panel unit 26.

The image processing unit 21 is a control calculation part such as a DSP (Digital Signal Processor), a GPU (Graphics Processing Unit), or the like. The image processing unit 21 performs various types of image processing on image data, such as blank page detection, enlargement/reduction, rotation, density adjustment, gradation adjustment, noise removal, sharpness, other image quality improvement, or the like.

The image processing unit 21 stores the image read by the document reading unit 22 in the storage unit 29 as print data. At this time, the image processing unit 21 can also convert the print data into a file such as PDF, TIFF, or the like.

The document reading unit 22 reads (scans) the set document. Further, the document reading unit 22 is arranged above the main body of the image forming apparatus 2.

The document reading unit 22 includes a scanner, platen glass, and a document reading slit. When reading a document placed on the platen glass, the document reading unit 22 moves the scanner to a position facing the platen glass. On this basis, the document reading unit 22 reads the document placed on the platen glass with scanning to acquire image data. The document reading unit 22 stores the acquired image data in the storage unit 29.

Further, the document reading unit 22 moves the scanner to a position facing the document reading slit when reading the document supplied from the document feeding unit 23. Then, the document reading unit 22 reads the document through the document reading slit in synchronization with the document transport operation by the document feeding unit 23, and it acquires image data. The document reading unit 22 stores the acquired image data in the storage unit 29.

The document feeding unit 23 transports the document read by the document reading unit 22. The document feeding unit 23 is arranged above the document reading unit 22.

The document feeding unit 23 includes a document placing unit and a document transport mechanism. The document feeding unit 23 sequentially feeds the documents placed on the document loading unit to the document reading unit 22 one by one by the document transport mechanism.

The paper feed unit 24 feeds the recording paper one by one toward the image forming unit 27. The paper feed unit 24 is provided in the main body unit.

The network transmitting and receiving unit 25 is a network connection unit including a LAN board, a wireless transmitter and receiver, and the like, for connecting to the public network 5*a* or the private network 5*b*.

The network transmitting and receiving unit 25 transmits/receives data on a data communication line, and it transmits/receives a voice signal on a voice telephone line.

The operation panel unit 26 includes an input unit such as a button, a touch panel, or the like, and a display unit such as an LCD (Liquid Crystal Display), an organic EL display, or the like. Further, the operation panel unit 26 is arranged on the front side of the image forming apparatus 2.

The input unit of the operation panel unit 26 includes a numeric keypad, a start button, a cancel button, an operation mode switching button, a button for instructing job execution, and the like. In the present embodiment, the type of operation mode may be copying, fax transmission, scanner, network scanner, or the like. The job type may be a print job, a send job, a save job, a record job, or the like, for a selected document.

The input unit of the operation panel unit 26 acquires instructions for various jobs of the image forming apparatus 2 by the user. Further, it may be possible to connect to the terminal 3 via the server 1 and instructs printing the confidential document 420 (FIG. 5) according to the user's instruction acquired from the operation panel unit 26.

The image forming unit 27 forms an image on the recording paper from the PDL (Page Description Language) data, or the like, of the confidential document 420 (FIG. 5) temporally stored in the storage unit 29 according to the print job acquired from server 1 by the user's instruction.

The image forming unit 27 includes a photoconductor drum, an exposure unit, a developing unit, a transfer unit, a fixing unit, and the like. The image forming unit 27 records a toner image on a recording paper by executing an image forming process including charging, exposure, development, transfer, and fixing.

The FAX transmitting and receiving unit 28 transmits and receives a facsimile. The FAX transmitting and receiving unit 28 can receive facsimile from another FAX apparatus via a voice line, store the received image data in the storage unit 29, and form the image in the image forming unit 27. Further, the FAX transmitting and receiving unit 28 can convert the document read by the document reading unit 22 and the network FAX data transmitted from the server 1, the external terminal into image data and facsimile-transmit to another FAX apparatus by voice line.

The storage unit 29 is a non-transitory recording medium including a semiconductor memory such as a ROM (Read Only Memory) or a RAM (Random Access Memory), an HDD (Hard Disk Drive), or the like.

The ROM or HDD of the storage unit 29 stores a control program and various data for controlling the operation of the image forming apparatus 2.

In addition, in the image forming apparatus 2, the control unit 20 and the image processing unit 21 may be integrally formed as like a CPU with built-in GPU or a chip-on module package.

Further, the control unit 20 and the image processing unit 21 may have a built-in RAM, ROM, flash memory, or the like.

(Configuration of Terminal 3)

Figure 4:
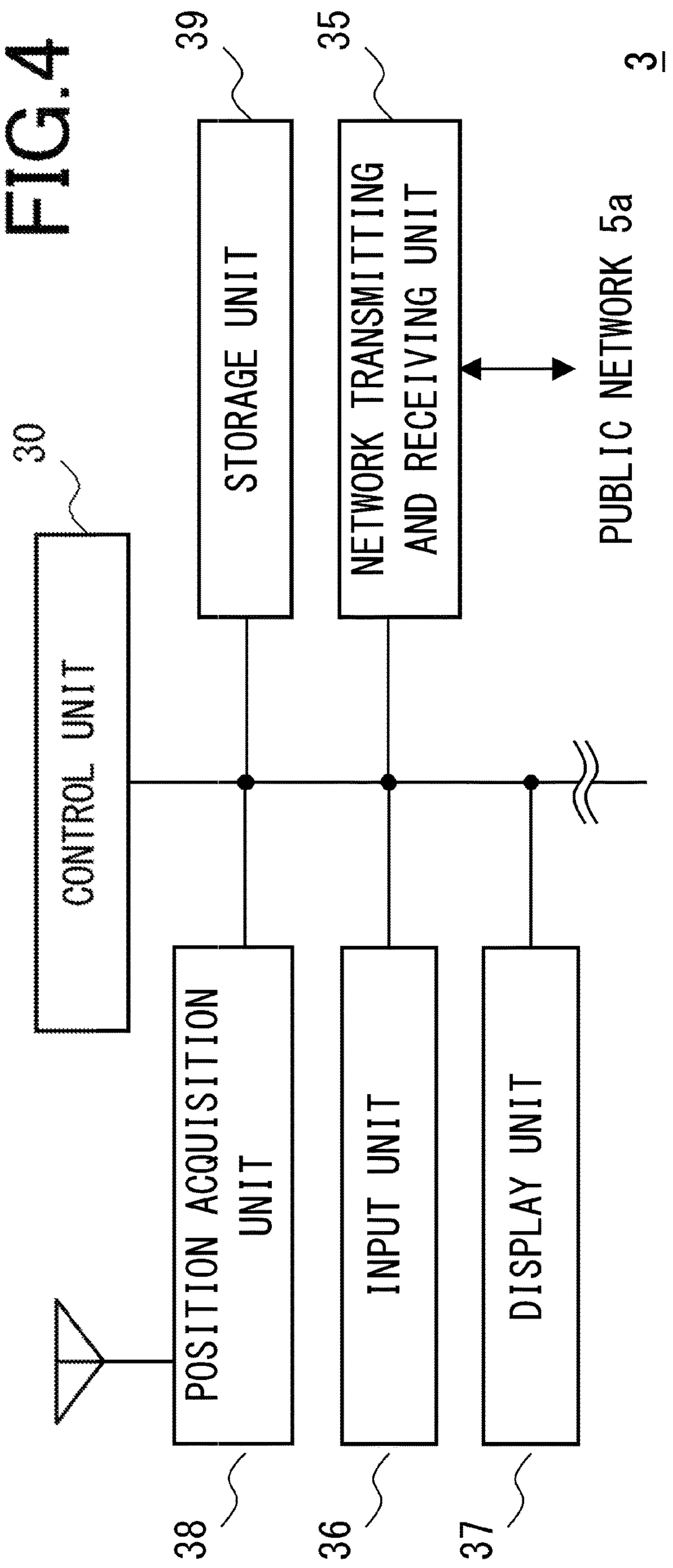
FIG. 4 is a block diagram showing a control configuration of the terminal as shown in FIG. 1.

Next, with reference to FIG. 4, the control configuration of the terminal 3 is described.

The terminal 3 includes a control unit 30, a network transmitting and receiving unit 35, an input unit 36, a display unit 37, a position acquisition unit 38, and a storage unit 39.

Each unit is connected to the control unit 30 and its operation is controlled by the control unit 30.

The control unit 30 is an information processing part such as a CPU, MPU, DSP, GPU, ASIC, or the like.

The control unit 30 reads out the control program stored in the auxiliary storage unit of the storage unit 39, expands the control program in the main storage unit, and executes the it, so that the control unit 30 can be operated as each part of the functional block as described later.

The network transmitting and receiving unit 35 is a network connection unit including a WiF™ transceiver, a LAN board, or the like, for connecting to the public network 5*a*.

The input unit 36 is an input device such as a touch panel, keyboard, buttons, mouse, touch pad, optical or electromagnetic digitizer, or the like, for performing operations by the user.

The display unit 37 is a display device such as an LCD (Liquid Crystal Display), an OEL display (Organic Electro-Luminescence Display), an LED (Light Emitting Diode), or the like.

The input unit 36 and the display unit 37 may be integrally formed so that the input unit 36 can detect the position (coordinates) on the display unit 37.

The position acquisition unit 38 is a circuit, or the like, which acquires position information 430 (FIG. 5) by GNSS (Global Navigation Satellite System) such as GPS (Global Positioning System), or the like. The position acquisition unit 38 may be a circuit, or the like, including a receiver and an antenna of the satellite positioning system. Alternatively, the position acquisition unit 38 may acquire the position information 430 indicating the current physical position of the terminal 3 by communicating with the mobile phone or another wireless base station by the network transmitting and receiving unit 35.

The storage unit 39 is anon-transitory recording medium. The storage unit 39 may include a RAM, or the like, as the main storage unit. Further, the storage unit 19 may include a ROM, an HDD, or the like, as an auxiliary storage unit. The ROM may be a flash memory configured as eMMC, SSD, or the like. A control program including an OS (Operating System) and an application for controlling the operation of the terminal 3 is stored in the auxiliary storage unit of the storage unit 39. The control program of the terminal 3 according to the present embodiment includes the above-mentioned dedicated application for confidential printing.

[Functional Configuration of Image Forming System X]

Here, with reference to FIG. 5, the functional configuration of the image forming system X according to the embodiment of the present disclosure is described.

The control unit 10 of the server 1 includes a location acquisition unit 100, an information acquisition unit 110, an authentication unit 120, and a location search unit 130.

The storage unit 19 stores installation location information 400, account setting 410, and a confidential document 420.

The control unit 20 of the image forming apparatus 2 includes a location transmission unit 200 and a confidential document acquisition unit 210. Here, as described above, one of each of the plurality of image forming apparatuses 2-1 to 2-*n* is described as the image forming apparatus 2.

The storage unit 29 stores the installation location information 400 and the confidential document 420.

The control unit 30 of the terminal 3 includes an information transmission unit 300 and a location presentation unit 310.

The storage unit 39 stores the installation location information 400, the position information 430, and the authentication information 440.

The location acquisition unit 100 acquires the installation location information 400 from each of the plurality of image forming apparatuses 2-1 to 2-*n* (image forming apparatus 2).

The information acquisition unit 110 acquires the position information 430 and the authentication information 440 from the terminal 3.

The authentication unit 120 authenticates with the authentication information 440 acquired by the information acquisition unit 110.

The location search unit 130 searches for the installation location information 400 stored in the storage unit 19 based on the position information 430 when the location search unit 130 is authenticated by the authentication unit 120, and it transmits the searched installation location information 400 to the terminal 3.

In the present embodiment, the location search unit 130 calculates a zip code from the position information 430 and transmits the installation location information 400 within the zip code to the terminal 3.

At this time, when the position information 430 is within a specific range from the boundary of the zip code, the location search unit 130 also transmits the installation location information 400 corresponding to the zip code beyond the boundary to the terminal 3. The boundary of the zip code may be a position on the map where the zip code becomes different. Further, as the specific range, an appropriate value such that the difference in coordinates between the position where the zip code becomes different and the position of the position information 430 is less than several miles may be set.

Further, the location search unit 130 calculates a position corresponding to the position information 430 from the installation location information 400, and it transmits this position to the terminal 3.

In the present embodiment, the storage unit 19 stores the installation location information 400 and the confidential document 420 acquired by the location acquisition unit 100.

The location transmission unit 200 transmits the installation location information 400 to the server 1. At this time, the location transmission unit 200 is capable to transmit the installation location information 400 to the server 1 installed in the private network 5*b* beyond the firewall 6.

The confidential document acquisition unit 210 acquires the confidential document 420 in response to an instruction from the terminal 3 authenticated by the server 1.

In the present embodiment, the image forming unit 27 forms an image of the acquired confidential document 420.

The information transmission unit 300 transmits the position information 430 acquired by the position acquisition unit 38 and the authentication information 440 input by the input unit 36 to the server 1.

The location presentation unit 310 receives the installation location information 400 indicating the installation location of the image forming apparatus close to the position information 430 from the server 1 and presents it to the user.

In the present embodiment, the location presentation unit 310 presents the acquired installation location information 400 by displaying it on the display unit 37.

At this time, the location presentation unit 310 is capable to display the installation location information 400 in order of proximity to the position information 430.

In the present embodiment, the position acquisition unit 38 acquires the position information 430.

Further, the input unit 36 inputs the authentication information 440. At this time, it is possible to input by GUI or the like.

The installation location information 400 includes a zip code and an address including a street number and the location of a building, that is, a physical address. In addition, the installation location information 400 may include a building or room in which the image forming apparatus 2 is installed, a map showing the installation position, or the like.

The installation location information 400 may be set in each image forming apparatus 2 by a system administrator such as an installer, a service person in charge of installation, a building manager, a store clerk, or the like, at the time of installation.

The installation location information 400 may be stored as a database in the storage unit 19 of the server 1. Further, the installation location information 400 may include an authentication code, key data, and the like, for authenticating the image forming apparatus 2. In addition, the installation location information 400 may include access information for connecting to the server 1 via the firewall 6. This access information may be, for example, a protocol type, a port number, a local IP address, a domain name information, or the like.

The account setting 410 is account information indicating whether or not the user can print the confidential document 420 on the server 1. The account setting 410 includes a username, a password, data for authenticating the authentication information 440 as described later, hash data, and the like. Further, the account setting 410 may include user's travel destination information. This travel destination information may include travel destination address and route information.

Confidential document 420 is a secure document for the military, the government, the hospital, the business, the partner, or the like. The confidential document 420 may be externally printable only by the user set in the account setting 410. The confidential document 420 may be stored in the database for the confidential document 420.

The position information 430 is GNSS coordinates, position information that can be converted into the physical address, or the like.

The authentication information 440 is data for user authentication including a username, a password, an authentication code, and the like. The authentication information 440 may be biometric authentication information, PIN code, gesture information, or the like. This biometric authentication information may be information for authentication such as a fingerprint, a vein image, an iris image, a face image, a voice signal, or the like. Further, the authentication information 440 may include other authentication information in consideration of security, such as a one-time password, two-step authentication information, or the like.

Here, the control unit 10 of the server 1 functions as the location acquisition unit 100, the storage unit, the information acquisition unit 110, the authentication unit 120, and the location search unit 130 by executing the control program stored in the storage unit 19.

The control unit 20 of the image forming apparatus 2 functions as the location transmission unit 200 and the confidential document acquisition unit 210 by executing the control program stored in the storage unit 29.

The control unit 30 of the terminal 3 functions as the information transmission unit 300 and the location presentation unit 310 by executing the control program stored in the storage unit 39.

Further, each unit of the server 1, the image forming apparatus 2, and the terminal 3 described above becomes a hardware resource for executing the locating method of the present disclosure.

In addition, a part or any combination of the above-mentioned functional configurations may be configured in terms of hardware or circuit by IC, programmable logic, FPGA (Field-Programmable Gate Array), or the like.

Further, each of the data stored in the storage units 19, 29, and 39 may be temporarily stored during the processing described below, or it may be kept storing during, or before and after the processing.

[Physical Address Acquisition Process by Image Formation System X]

Figure 6:
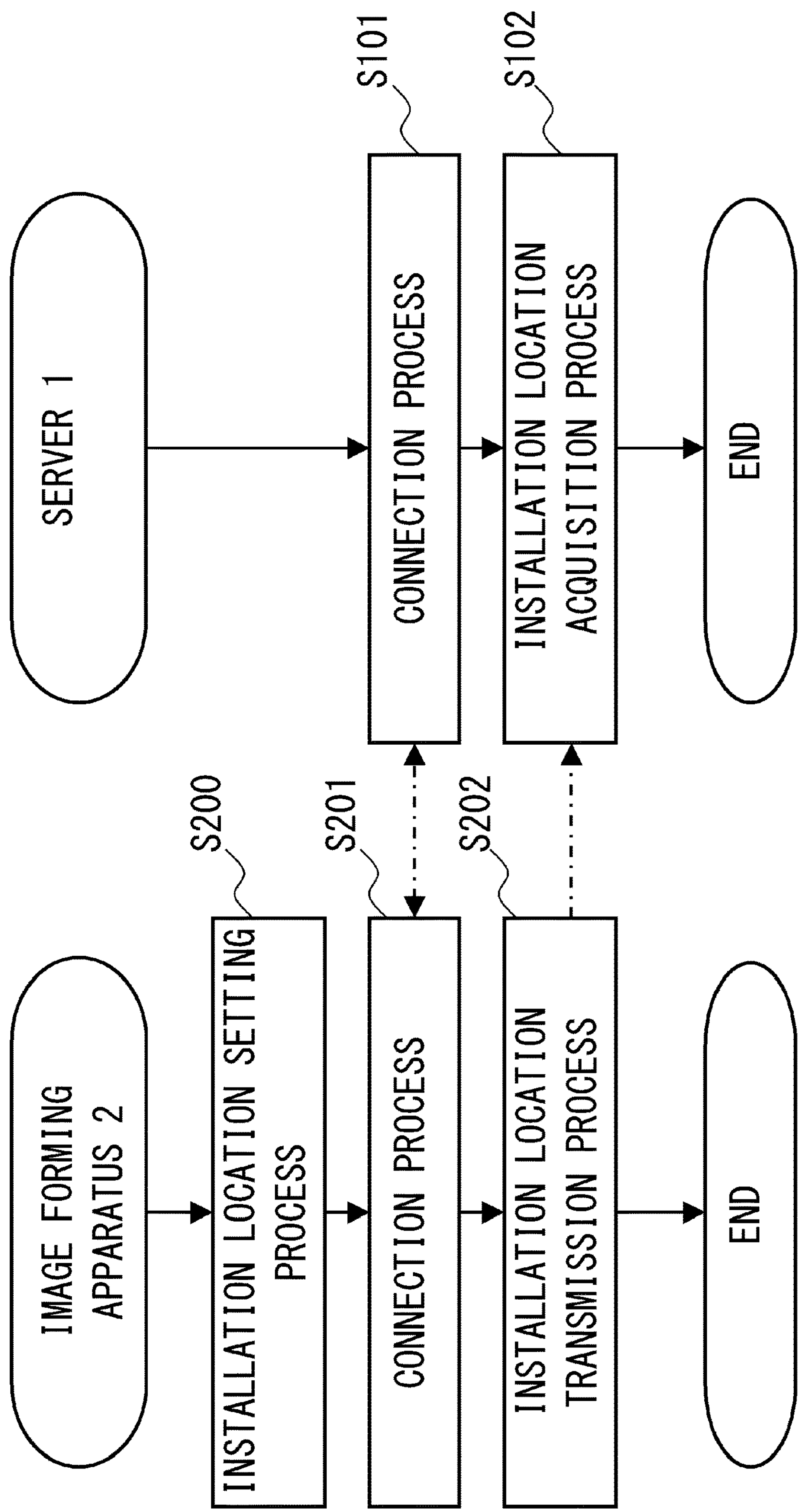
FIG. 6 is a flowchart of the physical address acquisition process according to the embodiment of the present disclosure.

Next, with reference to FIG. 6, the physical address acquisition process by the server 1 and the image forming apparatus 2 according to the embodiment of the present disclosure is described.

In this process, the physical address of the authenticated image forming apparatus 2 is transmitted to the server 1 and stored in the storage unit 19 of the server 1.

In the physical address acquisition process of the present embodiment, the control unit 10 of the server 1 mainly executes the control program stored in the storage unit 19, the control unit 20 of the image forming apparatus 2 executes the control program stored in the storage unit 29, in cooperation with each unit and by using the hardware resources.

Hereinafter, with reference to the flowchart of FIG. 6, the details of the physical address acquisition process according to the present embodiment is described step by step.

(Step S200)

Firstly, the location transmission unit 200 of the image forming apparatus 2 performs the installation location setting process.

Here, for example, the image forming apparatus 2 receives an operation of the system administrator of the image forming apparatus 2 by an input unit of the operation panel unit 26, a dedicated terminal, or the like. Then, the system administrator installs an application for connecting to the server 1 in the storage unit 29, and the like. When this application is launched, the system administrator can enter and set zip code, other addresses, and information such as a building, a room, a map, or the like, as the physical address. The location transmission unit 200 stores the physical address set by the system administrator in the storage unit 29 as the installation location information 400. At this time, in the present embodiment, the installation location information 400 may be set by using an authentication code for a special service so as not to be changed. This authentication code may include, for example, a public key or a private key, and identification information such as a serial number of the image forming apparatus 2, and the like.

(Step S101 and Step S201)

Next, the location transmission unit 200 of the image forming apparatus 2 and the location acquisition unit 100 of the server 1 perform the connection processes.

The installation transmitting unit 200 of the image forming apparatus 2 connects to the secure server 1. At this time, the location transmission unit 200 may connect to the server 1 by using the above-mentioned special authentication code. Further, in the case of the image forming apparatus 2 installed in the public network 5*a*, for example, the location transmission unit 200 can pass through the firewall 6 and connect to the server 1 by using the access information included in the installation location information 400.

Then, the location acquisition unit 100 of the server 1 authenticates the connected image forming apparatus 2. At this time, the location acquisition unit 100 may acquire a special authentication code and authenticate the connected image forming apparatus 2. As a result, the connected image forming apparatus 2 becomes the authenticated image forming apparatus 2.

(Step S202)

Next, the location transmission unit 200 of the image forming apparatus 2 performs the installation location transmission process.

The location transmission unit 200 of the authenticated image forming apparatus 2 transmits the set installation location information 400 to the server 1.

That is, the location transmission unit 200 can transmit the installation location information 400 including its physical address to the server 1. At the time of this transmission, the location transmission unit 200 may pass through the firewall 6 and transmit to the server 1 via the private network 5*b*.

(Step S102)

Here, the location acquisition unit 100 of the server 1 performs the installation location acquisition process.

The location acquisition unit 100 acquires the installation location information 400 from the authenticated image forming apparatus 2.

The location acquisition unit 100 acquires the installation location information 400 including the physical address of the connected authenticated image forming apparatus 2 and stores it in the storage unit 19. At this time, the location acquisition unit 100 may associate the installation location information 400 with the identification information of the image forming apparatus 2 and store so as to add a record to the database.

Further, the location acquisition unit 100 may periodically acquire the installation location information 400 for all the authenticated image forming apparatus 2 and store it in the database.

As described above, the physical address acquisition process according to the embodiment of the present disclosure is completed.

[Authenticated Apparatus Search Process by Image Forming System X]

Figure 7:
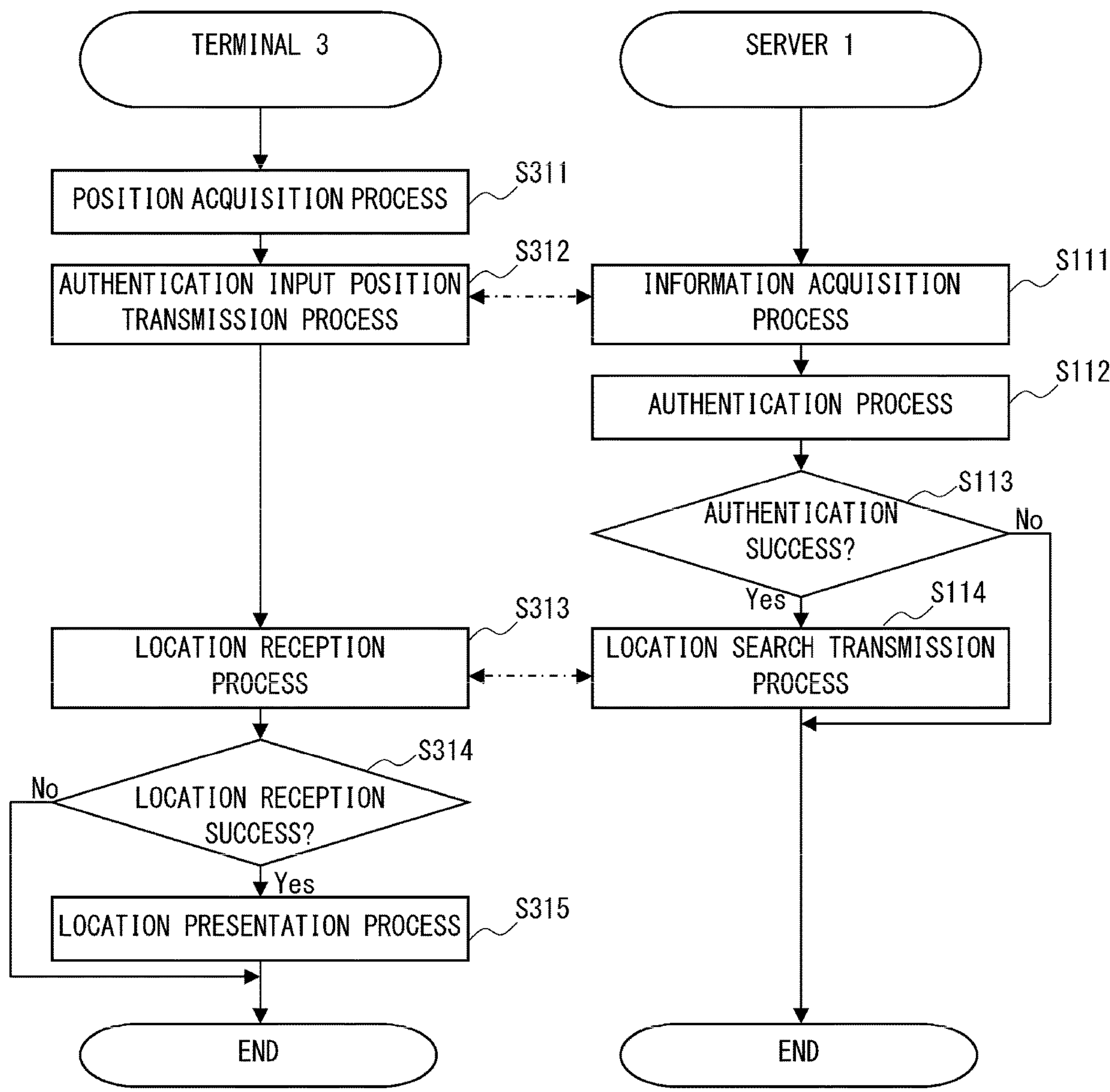
FIG. 7 is a flowchart of the authenticated apparatus search process according to the embodiment of the present disclosure.

Next, with reference to FIG. 7, the authenticated apparatus search process by the server 1 and the terminal 3 according to the embodiment of the present disclosure is described.

In this authenticated apparatus search process, the server 1 searches for the authenticated image forming apparatus 2 near the terminal 3 according to the user's instruction from the terminal 3. The terminal 3 receives the search result information from the server 1 and presents it to the user.

In the authenticated apparatus search process of the present embodiment, the control unit 10 of the server 1 mainly executes the control program stored in the storage unit 19, and the control unit 30 of the terminal 3 executes the control program stored in the storage unit 39 in cooperation with each unit and by using the hardware resources.

Hereinafter, with reference to the flowchart of FIG. 7, the details of the authenticated apparatus search process according to the present embodiment is described step by step.

(Step S311)

Firstly, the position acquisition unit 38 of the terminal 3 performs the position acquisition process.

The user searches for the authenticated image forming apparatus 2 and activates a dedicated application for instructing printing of the confidential document 420.

Then, the position acquisition unit 38 acquires the position information 430 by receiving the radio wave from the GNSS, or the like, or calculating the positional relationship among the base stations.

(Step S312)

Next, the information transmission unit 300 performs the authentication input position transmission process.

When the dedicated application is started, the information transmission unit 300 causes the display unit 37 to display a dialog box, or the like, requesting the input of the authentication information 440.

As a result, the user inputs the authentication information 440 via the input unit 36.

The information transmission unit 300 transmits the position information 430 acquired by the position acquisition unit 38 and the authentication information 440 inputted by the input unit 36 to the server 1.

At this time, although the information transmission unit 300 connects to the public network 5*a*, it can connect to the server 1 in the private network 5*b* whose connection is restricted via the firewall 6. In this case, for example, the information transmission unit 300 can connect to the server 1 by using the IPV6 address set in the dedicated application or performing address resolution by using a special protocol.

When the connection is established, the terminal 3 transmits the authentication information 440 to the server 1. At this time, the terminal 3 may access the server 1 while encrypting with the above-mentioned special authentication code.

(Step S111)

Here, the information acquisition unit 110 of the server 1 performs the information acquisition process.

The information acquisition unit 110 acquires the position information 430 and the authentication information 440 by accessing from the dedicated application of the terminal 3 via the public network 5*a* and the private network 5*b*. The information acquisition unit 110 temporarily stores the acquired position information 430 and authentication information 440 in the storage unit 19.

(Step S112)

Then, the authentication unit 120 performs the authentication process.

The authentication unit 120 authenticates with the authentication information 440 acquired by the information acquisition unit 110. Specifically, the authentication unit 120 refers to the account setting 410 and authenticates the user with the authentication information 440.

The authentication unit 120 authenticates with the username, password, authentication code, or the like, included in the authentication information 440. Further, the authentication unit 120 may authenticate whether or not the acquired position information 430 is included in the travel destination information. That is, the authentication unit 120 may authenticate whether or not the user is at the travel destination.

(Step S113)

Next, the authentication unit 120 determines whether or not the authentication is successful. The authentication unit 120 determines Yes if the authentication is successful in the above-mentioned authentication process. The authentication unit 120 determines No if authentication fails, or the like. Here, the authentication unit 120 may determine No if the user's position information 430 is not included in the travel destination information.

In the case of Yes, the authentication unit 120 approves the terminal 3 to access the server 1. As a result, the connection between the dedicated application of the terminal 3 and the server 1 is established. After that, the authentication unit 120 proceeds to the process in step S114.

In the case of No, the authentication unit 120 ends the authenticated apparatus search process and disconnects from the terminal 3.

(Step S114)

If the authentication is successful, the location search unit 130 of the server 1 performs the location search transmission process.

Here, the user requests the search of the authenticated image forming apparatus 2 by using the dedicated application of the terminal 3.

Then, the location search unit 130 acquires the request from the dedicated application of the terminal 3.

As a result, the location search unit 130 searches for the authenticated image forming apparatus 2 that is close to the user's position information 430.

Specifically, first, the location search unit 130 calculates a physical address such as a postal address from the position information 430 acquired from the terminal 3. The location search unit 130 can calculate the postal address, or the like, by using the map data stored in the storage unit 19, the map service on the cloud, or the like.

In the present embodiment, for example, the location search unit 130 calculates the zip code from the position information 430. On this basis, the location search unit 130 searches for the installation location information 400 included the calculated zip code with reference to the storage unit 19. Specifically, the location search unit 130 searches for the physical addresses of all the authenticated image forming apparatuses 2 in the calculated zip code. That is, the location search unit 130 searches for the physical addresses of all authenticated image forming apparatus 2 including the calculated zip code from the database of the storage unit 19.

At this time, if the acquired position information 430 is within the specific range from the boundary of the zip code, the location search unit 130 can also search the installation location information 400 corresponding to the zip code beyond the boundary.

On this basis, the location search unit 130 transmits the searched installation location information 400 to the dedicated application of the terminal 3.

Further, the location search unit 130 may calculate the position corresponding to the position information 430 from the installation location information 400 and transmit this position to the terminal 3.

Alternatively, the location search unit 130 may directly acquire the zip code corresponding to the position information 430 or the zip code inputted by the user by using the input unit 36 from the terminal 3. In this case as well, the location search unit 130 may search for the physical addresses of all the authenticated image forming apparatuses 2 in the zip code and transmit the searched information to the terminal 3.

In addition, if the physical address of the authenticated image forming apparatus 2 is not included in the acquired zip code of the location information 430 and the zip code beyond the boundary, the location search unit 130 tells that there is no physical address to the terminal 3.

(Step S313)

If the authentication is successful, the location presentation unit 310 performs the location reception process.

The location presentation unit 310 receives the installation location information 400 indicating the installation location of the authenticated image forming apparatus 2, which is close to the position information 430, from the server 1.

Specifically, the location presentation unit 310 waits for a response from the server 1 after transmitting the above-mentioned request.

Then, when the installation location information 400 is acquired, the location presentation unit 310 temporarily stores it in the storage unit 39. This makes it possible to acquire the physical address of the authenticated image forming apparatus 2 in the current zip code.

Here, if there is no response from the server 1, the location presentation unit 310 retransmits the request and waits for the reception of the installation location information 400. At this time, if the re-transmission exceeds the set maximum allowable number of times, the location presenting unit 310 stops the transmission of the request as an error such as a timeout, or the like.

(Step S314)

Next, the location presentation unit 310 of the terminal 3 determines whether or not the location reception is successful.

If the location presentation unit 310 acquires the installation location information 400, it determines Yes. In other cases, for example, if the location presentation unit 310 obtains the above-mentioned response to the effect that the search is not performed or an error occurs, the location presentation unit 310 determines No.

In the case of Yes, the location presentation unit 310 advances the process to step S315.

In the case of No, the location presentation unit 310 ends the authenticated apparatus search process.

(Step S315)

Here, the location presentation unit 310 performs the location presentation process.

The location presentation unit 310 displays the installation location information 400 in order of closeness from the position information 430.

Specifically, the location transmission unit 200 compares the received physical address of the authenticated image forming apparatus 2 with the current position information 430. Then, the place transmission unit 200 arranges the authenticated image forming apparatuses 2 nearby in the order of distance from the closest side, and it displays them on the display unit 37.

In addition, if the location presentation unit 310 receives a response that the search is not performed, the location presentation unit 310 may display a display such as "a printer cannot be found nearby" on the display unit 37. On the other hand, the location presentation unit 310 may display the content of the error on the display unit 37 even in the case of an error.

As described above, the authenticated apparatus search process according to the embodiment of the present disclosure is completed.

[Confidential Document Printing Process by Image Formation System X]

Figure 8:
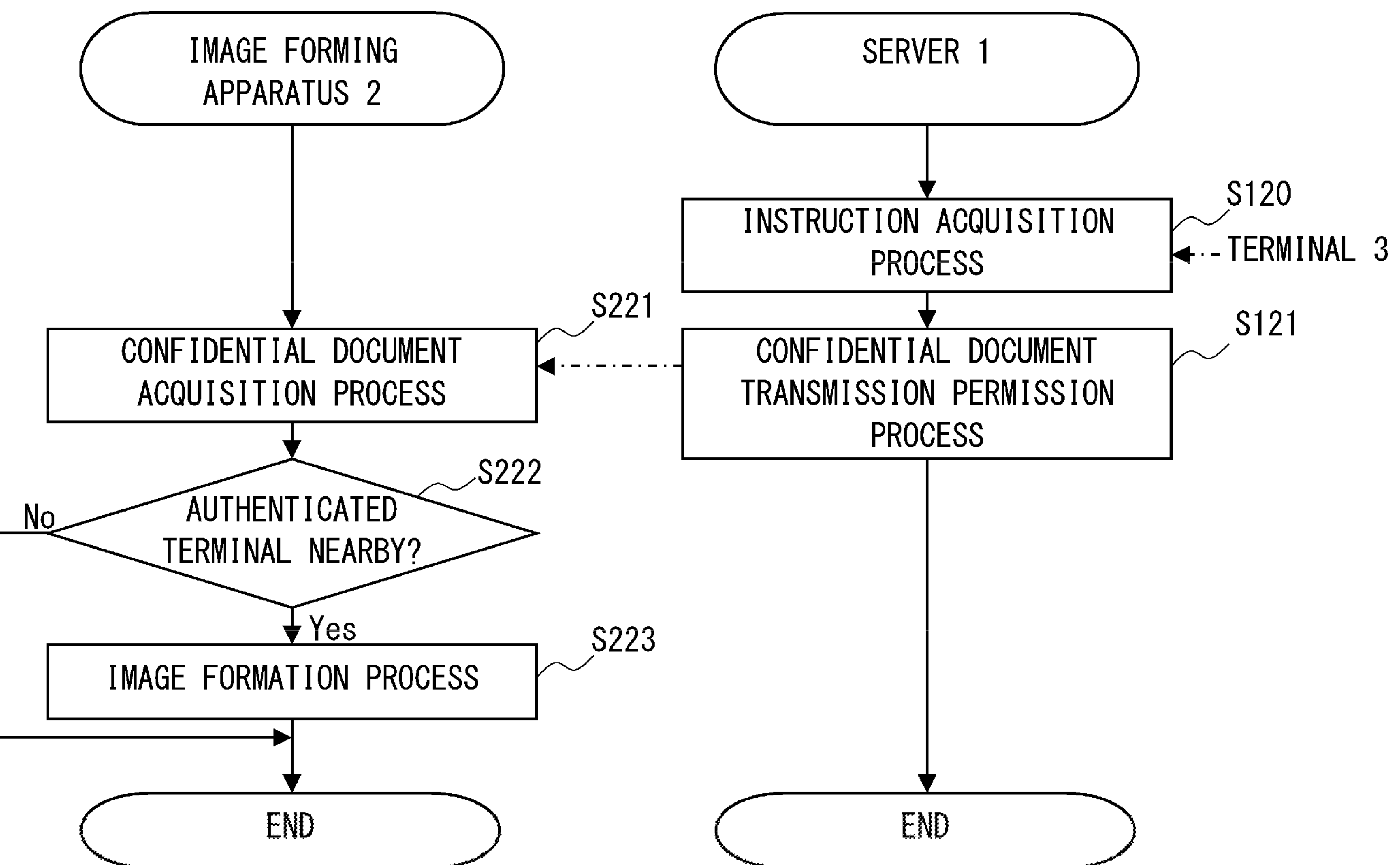
FIG. 8 is a flowchart of the confidential document printing process according to the embodiment of the present disclosure.

Next, with reference to FIG. 8, the confidential document printing process by the image forming system X according to the embodiment of the present disclosure is described.

In this confidential document printing process, a print job is transmitted from the server 1 and printed out according to an instruction from the terminal 3 authenticated by the server 1.

In the confidential document printing process of the present embodiment, the control unit 10 of the server 1 mainly executes the control program stored in the storage unit 19, and the control unit 20 of the image forming apparatus 2 executes the control program stored in the storage unit 29, the control unit 30 of the terminal 3 executes the control program stored in the storage unit 39, in cooperation with each unit by using the hardware resources.

Hereinafter, with reference to the flowchart of FIG. 8, the details of the confidential document printing process according to the present embodiment is described step by step.

(Step S120)

Firstly, the location search unit 130 of the server 1 performs an instruction acquisition process.

Here, the dedicated application of the terminal 3 can access the confidential document 420 stored in the server 1, which is secured and protected, after the authentication. That is, the user can browse the list of printable confidential documents 420 and instruct printing from the dedicated application.

Upon acquiring the print instruction from the user's input unit 36, the location presentation unit 310 of the terminal 3 transmits this to the server 1.

The location search unit 130 of the server 1 acquires the printing instruction.

(Step S121)

Here, in the case of the authenticated terminal 3, the location search unit 130 of the server 1 performs the confidential document transmission permission process.

The location search unit 130 transmits a print job to the authenticated image forming apparatus 2 closest to the position information 430 of the terminal 3. Specifically, the location search unit 130 sets the confidential document 420 in a state where this image forming apparatus 2 can acquire the confidential document 420 as the print job, and it notifies to this image forming apparatus 2 of the state. As a result, the image forming apparatus 2 can acquire the confidential document 420 by a security-conscious protocol such as HTTPs or SFTP (SSH File Transfer Protocol).

(Step S221)

Here, the confidential document acquisition unit 210 of the image forming apparatus 2 performs the confidential document acquisition process.

The confidential document acquisition unit 210 acquires the confidential document 420 from the server 1 as a print job and temporarily stores it in the storage unit 29. The confidential document acquisition unit 210 may acquire the confidential document 420 by using a security-conscious protocol. Further, the confidential document 420 may be encrypted with the special authentication code. This makes it possible to prevent an outsider from printing or viewing the confidential document 420.

(Step S222)

Then, the confidential document acquisition unit 210 of the image forming apparatus 2 to which the print job is transmitted determines whether or not the authenticated terminal 3 is nearby.

If the confidential document acquisition unit 210 confirms that the terminal 3 is certainly on the side of the image forming apparatus 2, it determines Yes. Therefore, the confidential document acquisition unit 210 may communicate with the dedicated application of the terminal 3 via the server 1 or by WiFi-direct, or the like, to confirm that the terminal 3 is authenticated. Further, the confidential document acquisition unit 210 may acquire the position information 430 again at the time of this communication and confirm that it is near the installation location information 400 stored in the storage unit 19. Further, the confidential document acquisition unit 210 may confirm the user itself by logging in to the user of the terminal 3, inputting a PIN or a one-time password, or performing biometric authentication, from the operation panel unit 26.

Based on these confirmations, the confidential document acquisition unit 210 determines No if the terminal 3 is not on the side of the image forming apparatus 2.

In the case of Yes, the confidential document acquisition unit 210 advances the process to step S223.

In the case of No, the confidential document acquisition unit 210 ends the confidential document printing process and discards the confidential document 420. Then, the confidential document acquisition unit 210 transmits the determination result to the server 1.

(Step S223)

Then, the confidential document acquisition unit 210 and the image forming unit 27 perform the image forming process.

The confidential document acquisition unit 210 causes the image forming unit 27 to form an image of the acquired confidential document 420. At this time, the confidential document acquisition unit 210 can decrypt the confidential document 420 with the authentication code for each page, discard the decrypted data after printing, or add a watermark to the printed matter. Further, the confidential document acquisition unit 210 may delete the confidential document 420 after the print output.

As described above, the confidential document printing process according to the embodiment of the present disclosure is completed.

As configured in this way, the following effects can be obtained.

In a typical technology, a method of identifying a printing apparatus and performing printing is disclosed. This method used a wireless beacon such as Bluetooth® that needs to be installed and activated in the image forming apparatus 2.

Therefore, the printing apparatus could be specified only in the range where the wireless beacon can be received, for example, inside a building.

On the other hand, the image forming system X according to the embodiment of the present disclosure is an image forming system including a terminal 3, a server 1, and a plurality of image forming apparatuses 2. The terminal 3 includes a position acquisition unit 38 that acquires position information 430, an input unit 36 that inputs authentication information 440, an information transmission unit 300 that transmits the position information 430 acquired by the position acquisition unit 38 and the authentication information 440 input by the input unit 36 to the server 1, a location presentation unit 310 that receives and presents the installation location information 400 indicating the installation location of the image forming apparatus 2 close to the position information 430 from the server 1. The server 1 includes a location acquisition unit 100 that acquires installation location information 400 from each of the plurality of image forming apparatuses 2, a storage unit 19 that stores installation location information 400 acquired by the location acquisition unit 100 and a confidential documents 420, an information acquisition unit 110 that acquires the position information 430 and the authentication information 440 from the terminal 3, authentication unit 120 that authenticates with authentication information 440 acquired by information acquisition unit 110, and a location search unit 130 that searches for the installation location information 400 stored in the storage unit 19 and transmits the installation location 400 to the terminal 3 based on the position information 430 when authenticated by the authentication unit 120. Each of the plurality of image forming apparatuses 2 includes a location transmitting unit 200 that transmits the installation location information 400 to the server 1, a confidential document acquisition unit 210 that acquires the confidential document 420 in response to an instruction from the terminal 3 authenticated by the server 1, and an image forming unit 27 that forms an image of the confidential document 420.

With such a configuration, it is not necessary to provide a wireless beacon, and it is possible to provide an image forming system that can search and identify an image forming apparatus beyond the range of the wireless beacon. As a result, a user such as a traveler can search for the authenticated image forming apparatus 2. Then, the confidential document 420 stored in the server 1 in consideration of security can be printed by the searched image forming apparatus 2. Therefore, users belonging to the military, government, a hospital, a company, a partner, or the like, can safely and easily print the confidential document 420 even at travel destination.

In the image forming system X according to the embodiment of the present disclosure, the installation location information 400 includes a zip code, and the location search unit 130 calculates the zip code from the position information 430 and presents the installation location information 400 in the zip code to the terminal 3.

With this configuration, the image forming apparatus 2 that is near the terminal 3 and is reachable can easily be searched by using the zip code. Therefore, the convenience of the user can be improved.

In the image forming system X according to the embodiment of the present disclosure, the location presentation unit 310 displays the installation location information 400 in order of closest from the position information 430.

With this configuration, even if the installation location is searched by zip code, the authenticated image forming apparatus 2 can be presented in the order of closeness. As a result, the user can access the closest image forming apparatus 2 except for the distant image forming apparatus 2 regardless of the zip code. Therefore, the convenience of the user can further be improved.

In the image forming system X according to the embodiment of the present disclosure, the location search unit 130, when the position information 430 is within a specific range from the boundary of the zip code, also presents the installation location information 400 corresponding to the zip code beyond the boundary to the terminal 3.

With this configuration, it is possible to search for and present the authenticated image forming apparatus 2, which locates to the boundary of the county, or the like, and has the different zip code but close to. Therefore, the user can print the confidential document 420 even at a zip code different from the zip code at the current position, which can improve convenience.

In the image forming system X according to the embodiment of the present disclosure, the location search unit 130 calculates a position corresponding to the position information 430 from the installation location information 400 and transmits the position to the terminal 3.

With this configuration, it is possible to display the installation location information 400 on a map of a dedicated application, for example, instead of simply indicating the installation location information 400 by an address. Thereby, the convenience can be further enhanced.

OTHER EMBODIMENTS

In the above-described embodiment, an example in which the confidential document 420 is already stored in the server 1 has been described.

However, the terminal 3 may include a document transmission unit that transmits the confidential document 420 to the server. Here, the document transmission unit may be able to transmit the confidential document 420 to the server 1 when "print" or "send" is selected by the user on the dedicated application of the terminal 3. In this case, the document transmission unit converts electronic document data such as PDF and files of various applications, or the like, stored in the terminal 3 into print job data such as PDL and the like, and sends the data to the server 1. In this case as well, the document transmission unit may set a special authentication code, one-time password, or PIN and add it to the data of this print job. Alternatively, the document transmission unit may be configured to acquire the confidential document 420 from another server of the organization to which the user belongs, a server on the cloud, and directly transmit it to the server 1. Alternatively, the document transmission unit may set the necessary confidential document 420 in accordance with the user inputting the travel destination information, and it acquire and store the necessary confidential document 420 according to the user's instruction.

With such a configuration, the convenience of the user is enhanced, and the necessary confidential document 420 can be easily printed by the authenticated image forming apparatus 2.

Further, in the above-described embodiment, an example in which the confidential document 420 is acquired from the server 1 and printed is described.

However, with the scanner of the searched authenticated image forming apparatus 2, or the like, a document that is a printed matter owned by the user can be scanned, uploaded this as a confidential document 420 to the server 1, and stored it. In this case, uploading may be possible only from the closest image forming apparatus 2 searched in accordance with the user authentication by the dedicated application of the terminal 3 of the above-described embodiment.

With this configuration, the confidential document 420 can be stored as well as printed. Furthermore, it may be possible to share this stored confidential document 420 with other users. As a result, the convenience of the user can be improved.

In the above-described embodiment, an example in which the system administrator sets the installation location information 400 when the image forming apparatus 2 is installed has been described.

However, each image forming apparatus 2 may be provided with a functional block similar to the position acquisition unit 38 of the terminal 3, such as a GNSS receiver, a communication unit for mobile network, or the like. As a result, each image forming apparatus 2 may directly acquire similar position information as the position information 430 and set the installation location information 400 based on the acquired position information. Further, the installation location information 400 acquired in this way may also be transmitted to the server 1 and compared with the information of the physical address, which has already been acquired. In this case, if they do not match, the authentication may be revoked as an error.

Further, for example, based on the acquired position information, each image forming apparatus 2 may include position information in units of several meters even inside the building into the installation location information 400. On this basis, the position information 430 of the terminal 3 may be compared with the position information included in the installation location information 400 of the authenticated image forming apparatus 2.

With such a configuration, the user can easily access the authenticated image forming apparatus 2. Therefore, the convenience can be further enhanced.

Further, in the above-described embodiment, basically, it is described that the installation location information 400 is searched by the zip code.

However, as described above, the server 1 may acquire the position information based on the GNSS or the mobile network similar to the position acquisition unit 38 of the terminal 3 and store it as the installation location information 400. On this basis, it is also possible to search the position information 430 transmitted from the terminal 3 and the position information of the installation location information 400 to search each image forming apparatus 2 without using the zip code.

In this case, the server 1 can search the position information 430 for the position information stored in the installation location information 400, and it can directly transmit the position information to the terminal 3. Here, when the server 1 stores the installation location information 400 including the physical address as the postal address, it may be possible to convert this into location information. On the terminal 3, these can be displayed as it is on the map as the position of the authenticated image forming apparatus 2.

As a result, the user can more easily grasp the position of the authenticated image forming apparatus 2, and the convenience can be enhanced.

In the above-described embodiment, an example of searching the installation location information 400 of the authenticated image forming apparatus 2 by a zip code has been described.

However, although the search is usually performed by using the zip code, depending on a condition, the search may be performed by using the information on the position of the physical address of the authenticated image forming apparatus 2. The condition may include the case where the user is at the border of the zip code, that is, the border of the county or state, or the like. In this case, the area of the same zip code on the map may be set by the coordinates of the polygons, and the distance from the edge of each polygon is calculated from the user's position information 430. Then, if this distance is closer than the specific distance, it may be determined to be at the border. In addition, this specific distance can be set as the above-mentioned specific range.

With this configuration, the user can search for a closer and more suitable authenticated image forming apparatus 2 when the user is at the boundary position between the zip codes. Therefore, the convenience of the user can be further enhanced.

In addition, in such a case, the search may be performed in consideration of the situation such as whether the user is moving by car, walking or biking, and the route of them.

In the above-described embodiment, it is described that the confidential document 420 can be printed only if the terminal 3 is near the image forming apparatus 2 to which the installation location information 400 is transmitted.

However, if there is a dedicated staff member who stores the printed matter of the confidential document 420 when it is printed, or the like, the location search unit 130 of the server 1 may be instructed the staff to store the printed matter by e-mail, chat, SMS, or the like. Whether or not there is the staff, or the like, in this way may be set in the installation location information 400.

With this configuration, both security and user convenience can be achieved.

In the above-described embodiment, the location acquisition unit 100 of the server 1 is described so as to authenticate and acquire the installation location information 400 when the image forming apparatus 2 is installed.

However, the location acquisition unit 100 may search the image forming apparatus 2 in the public network 5*a* and the private network 5*b* to acquire the installation location information 400. Alternatively, the location acquisition unit 100 may determine the status of each image forming apparatus 2 and perform authentication according to service information such as billing.

Further, the present disclosure can be applied to an information processing apparatus other than the image forming apparatus. That is, a network scanner, a server 1 in which the scanner is separately connected by USB, or the like, may be used.

Further, it goes without saying that the configuration and operation of the above-described embodiment are examples, and it can be appropriately modified and executed without departing from the aim of the present disclosure.

EXPLANATION OF SYMBOLS

1 SERVER
2, 2-1 TO 2-N IMAGE FORMING APPARATUS
3 TERMINAL
5A PUBLIC NETWORK
5B PRIVATE NETWORK
6 FIREWALL
10, 20, 30 CONTROL UNIT
15, 25, 35 NETWORK TRANSMITTING AND RECEIVING UNIT
19, 29, 39 STORAGE UNIT
21 IMAGE PROCESSING UNIT
22 DOCUMENT READING UNIT
23 DOCUMENT FEEDING UNIT
24 PAPER FEEDING UNIT
26 OPERATION PANEL UNIT
27 IMAGE FORMING UNIT
28 FAX TRANSMITTING AND RECEIVING UNIT
36 INPUT UNIT
37 DISPLAY UNIT
38 POSITION ACQUISITION UNIT
100 LOCATION ACQUISITION UNIT
110 INFORMATION ACQUISITION UNIT
120 AUTHENTICATION UNIT
130 LOCATION SEARCH UNIT
200 LOCATION TRANSMISSION UNIT
210 CONFIDENTIAL DOCUMENT ACQUISITION UNIT
300 INFORMATION TRANSMISSION UNIT
310 LOCATION PRESENTATION UNIT
400 INSTALLATION LOCATION INFORMATION
410 ACCOUNT SETTING
420 CONFIDENTIAL DOCUMENT
430 POSITION INFORMATION
440 AUTHENTICATION INFORMATION
FIG. 6:
S200: INSTALLATION LOCATION SETTING PROCESS
S201: CONNECTION PROCESS
S101: CONNECTION PROCESS
S202: INSTALLATION LOCATION TRANSMISSION PROCESS

S102: INSTALLATION LOCATION ACQUISITION PROCESS
END
FIG. 7:
S311: POSITION ACQUISITION PROCESS
S312: AUTHENTICATION INPUT POSITION TRANSMISSION PROCESS
S111: INFORMATION ACQUISITION PROCESS
S112: AUTHENTICATION PROCESS
S113: SUCCESSFUL AUTHENTICATION?
S114: LOCATION SEARCH TRANSMISSION PROCESS
S313: LOCATION RECEPTION PROCESS
S314: SUCCESSFUL LOCATION RECEPTION?
S315: LOCATION PRESENTATION PROCESS
END
FIG. 8:
S120: INSTRUCTION ACQUISITION PROCESS
S121: CONFIDENTIAL DOCUMENT TRANSMISSION PERMISSION PROCESS
S221: CONFIDENTIAL DOCUMENT ACQUISITION PROCESS
S222: IS THERE AN AUTHENTICATED TERMINAL NEARBY?
S223: IMAGE FORMATION PROCESS
END

What is claimed is:

1. An image forming system having a terminal, a server, and a plurality of authenticated image forming apparatuses, wherein:
the terminal includes:
a position acquisition unit that acquires position information,
an input unit that inputs authentication information,
an information transmission unit configured to transmit the position information acquired by the position acquisition unit and the authentication information inputted by the input unit to the server, and
a location presentation unit configured to receive and present installation location information indicating an installation location of an image forming apparatus close to the position information from the server;
the server includes:
a location acquisition unit configured to acquire the installation location information from each of the plurality of image forming apparatuses,
a storage unit that stores the installation location information acquired by the location acquisition unit and a confidential document,
an information acquisition unit configured to acquire the position information and the authentication information from the terminal,
an authentication unit configured to authenticate with the authentication information acquired by the information acquisition unit, and
a location search unit configured to search for the installation location information stored in the storage unit and transmit the installation location to the terminal based on the position information when authenticated by the authentication unit; and
each of the plurality of image forming apparatuses includes:
a location transmitting unit configured to transmit the installation location information to the server,
a confidential document acquisition unit configured to acquire the confidential document in response to an instruction from the terminal authenticated by the server, and
an image forming unit that forms an image of the confidential document; wherein
the installation location information includes a zip code;
the location search unit calculates the zip code from the position information and presents the installation location information in the zip code to the terminal; and
the location search unit,
when the position information is within a specific range from boundary of the zip code, also presents the installation location information corresponding to the zip code beyond the boundary to the terminal.

2. The image forming system according to claim 1, wherein
the location presentation unit displays
the installation location information in order of closest from the position information.

3. The image forming system according to claim 1, wherein
the location search unit calculates position corresponding to the position information from the installation location information and transmits the position to the terminal.

4. A server of an image forming system having a terminal, a server, and a plurality of image forming apparatuses, comprising:
a location acquisition unit configured to acquire installation location information from each of the plurality of image forming apparatuses;
a storage unit that stores the installation location information acquired by the location acquisition unit and a confidential document;
an information acquisition unit configured to acquire position information and authentication information from the terminal;
an authentication unit configured to authenticate with the authentication information acquired by the information acquisition unit; and
a location search unit configured to search for the installation location information stored in the storage unit and transmits the installation location to the terminal based on the position information when authenticated by the authentication unit; wherein
the installation location information includes a zip code;
the location search unit calculates the zip code from the position information and presents the installation location information in the zip code to the terminal; and
the location search unit,
when the position information is within a specific range from boundary of the zip code, also presents the installation location information corresponding to the zip code beyond the boundary to the terminal.

5. The server according to claim 4, wherein
the location presentation unit displays
the installation location information in order of closest from the position information.

6. The server according to claim 4, wherein
the location search unit calculates position corresponding to the position information from the installation location information and transmits the position to the terminal.

7. A locating method performed by an image forming system having a terminal, a server, and a plurality of image forming apparatuses, comprising the steps of:
by each of the plurality of image forming apparatuses, transmitting installation location information to the server;

by the server, acquiring the installation location information from each of the plurality of image forming apparatuses;

by the server, storing acquired installation location information and a confidential document;

by the terminal, acquiring position information;

by the terminal, inputting authentication information;

by the terminal, transmitting acquired position information and inputted authentication information to the server;

by the server, acquiring the position information and the authentication information from the terminal;

by the server, authenticating with acquired authentication information;

by the server, searching for stored installation location information based on the position information and transmitting the installation location to the terminal when authenticated;

by the terminal, receiving and presenting the installation location information indicating the installation location of an image forming apparatus, of the plurality of image forming apparatuses, close to the position information from the server; and by each of the plurality of image forming apparatuses, acquiring the confidential document in response to an instruction from the terminal authenticated by the server; wherein the installation location information includes a zip code; and the method further comprises the steps of calculating the zip code from the position information and presenting the installation location information in the zip code to the terminal; and also presenting, when the position information is within a specific range from boundary of the zip code, the installation location information corresponding to the zip code beyond the boundary to the terminal.

8. The locating method according to claim 7, further comprising the step of:

displaying the installation location information in order of closest from the position information.

9. The locating method according to claim 7, further comprising the steps of:

calculating position corresponding to the position information from the installation location information, and transmitting the position to the terminal.

* * * * *